United States Patent
Eckenroth

(10) Patent No.: US 6,192,620 B1
(45) Date of Patent: Feb. 27, 2001

(54) ADJUSTABLE BOYANCY FISHING FLOAT

(76) Inventor: Kevin R. Eckenroth, 2407 N. 8th St., St. Charles, MO (US) 63301

( * ) Notice: Subject to any disclaimer, the term of this patent is extended or adjusted under 35 U.S.C. 154(b) by 0 days.

(21) Appl. No.: 09/348,512

(22) Filed: Jul. 7, 1999

Related U.S. Application Data

(60) Provisional application No. 60/124,189, filed on Mar. 15, 1999.

(51) Int. Cl.[7] .................................................. A01K 93/00
(52) U.S. Cl. .......................................... 43/43.14; 43/44.92
(58) Field of Search .............................. 43/43.14, 44.87, 43/44.92

(56) References Cited

U.S. PATENT DOCUMENTS

| | | | |
|---|---|---|---|
| 3,271,893 | * | 9/1966 | Bowers ................................. 43/43.14 |
| 3,337,981 | * | 8/1967 | Bowman ............................... 43/43.14 |
| 4,090,318 | * | 5/1978 | Webster ................................ 43/43.14 |
| 5,404,668 | * | 4/1995 | Christensen .......................... 43/44.87 |

* cited by examiner

Primary Examiner—Kurt Rowan
(74) Attorney, Agent, or Firm—Henry W. Cummings

(57) ABSTRACT

In accordance with the present invention an air chamber is formed with a plastic convoluted bellows tube which can be expanded or contracted to vary the size of the air chamber. Shaft guides at the top and bottom of the tube each have an opening in the center which receive a plastic shaft. The lower shaft guide has a small opening to allow air to enter and exit the bellows. The shaft has, at its lower end, structure for attaching a fishing line containing bait and and one or more fish hooks. At its upper end the plastic shaft includes structure which facilities viewing the float from a distance.

18 Claims, 1 Drawing Sheet

ADJUSTABLE BOYANCY FISHING FLOAT

REFERENCE TO RELATED APPLICATION

This is a continuation-in-part of Provisional Application Ser. No. 60/124,189 filed Mar. 15, 1999.

FIELD OF THE INVENTION

This invention relates to fishing floats or "bobbers".

BACKGROUND OF THE INVENTION

U.S. Pat. No. 3,337,981 discloses a fishing float in which the boyancy is varied by rotating a pair of telescoping threaded members relative to each other to vary the volumn of an interior air chamber.

U.S. Pat. No. 4,944,113 discloses a fishing float in which the boyancy is varied by moving longitudinally a pair of telescoping members relative to each other to vary the volumn of an interior air chamber.

SUMMARY OF THE INVENTION

A. Objects of the Invention

One object of the present invention is to provide an adjustable boyancy float or bobber in which the air chamber is formed by a single ajustable tubular member.

Another object is to provide an adjustable boyancy float or bobber having an indicator in the upper portion of the float to facilitate observing the location of the float and when the bait below the float has been struck.

Another object is to provide a convenient and reliable structure for attaching a fishing line to the float.

B. Summary

In accordance with the present invention an air chamber is formed with a plastic convoluted bellows tube which can be expanded or contracted to vary the size of the air chamber. Shaft guides at the top and bottom of the tube each have an opening in the center which receive a plastic shaft. The lower shaft guide has a small opening to allow air to enter and exit the bellows. The shaft has, at its lower end, structure for attaching a fishing line containing bait and and one or more fish hooks. At its upper end the plastic shaft includes structure which facilities viewing the float from a distance.

THE DRAWINGS

DESCRIPTION OF PREFERRED EMBODIMENTS

Figure 1:
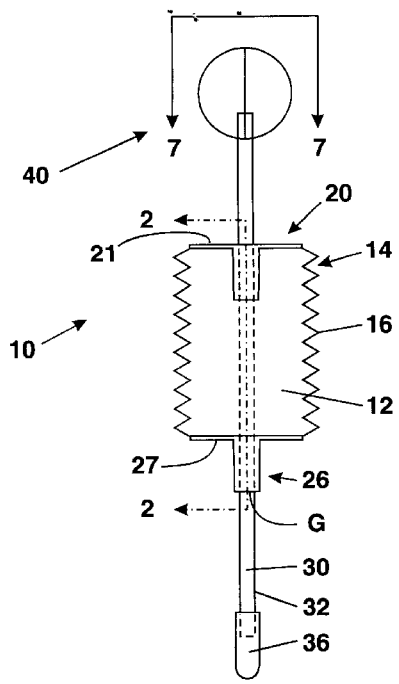
FIG. 1 is a side elevation view of the the adjustable boyancy float of the present invention.
Figure 2:
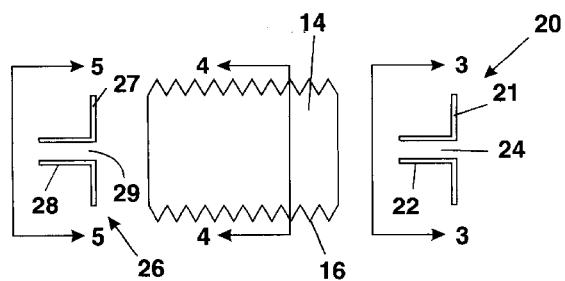
FIG. 2 is an exploded view looking in the direction of the arrows along the line 2—2 in FIG. 1.
Figure 3:
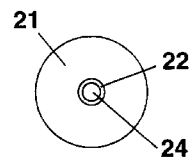
FIG. 3 is a view looking in the direction of the arrows along the line 3—3 in FIG. 2.
Figure 4:
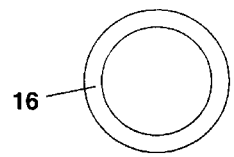
FIG. 4 is a sectional view looking in the direction of the arrows along the line 4—4 in FIG. 2.
Figure 5:
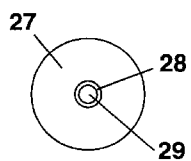
FIG. 5 is a view looking in the direction of the arrows along the line 5—5 in FIG. 2.
Figure 6:
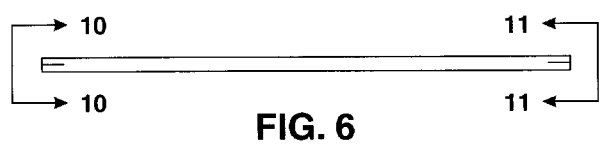
FIG. 6 is a detail view of the shaft member.
Figure 7:
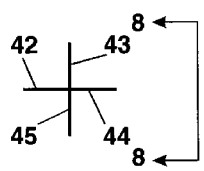
FIG. 7 is a plan view looking in the direction of the arrows along the line 7—7 in FIG. 1.
Figure 8:
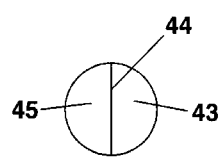
FIG. 8 is a side elevation view looking in the direction of the arrows along the line 8—8 in FIG. 7.
Figure 9:
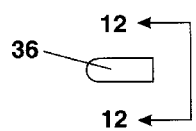
FIG. 9 is a detail view of the bottom cap member.
Figure 10:
FIG. 10 is a bottom view looking in the direction of the arrows along the line 10—10 in FIG. 6.
Figure 11:
FIG. 11 is a plan view looking in the direction of the arrows along the line 11—11 in FIG. 6.
Figure 12:
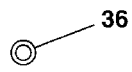
FIG. 12 is a view looking in the direction of the arrows along the line 12—12 in FIG. 9.

In accordance with the present invention, a boyancy adjustable float 10 includes an air chamber 12 formed from a plastic convoluted bellows tube 14 having convolutions 16 which can be expanded or contracted to vary the size of the air chamber 12, and which remain in the expanded or contracted state without additional structure to hold it in place. An example is "expandoflex medical tubing" made of polyethylene or polypropylene available from WOCO ENGINEERING. Sample specification sheets are available in the Application file. Additional information concerning a suitable material may be found in U.S. Pat. No. 5,395,278, hereby incorporated into the present application by this reference, as if fully set forth herein.

Shaft guides 20 and 26 at the top and bottom of the tube, preferably made of plastic. Each have flange portions 21, 27, hollow guide portions 22, 28 and openings in the center 24, 29, which receive a plastic shaft 30, for example made of arylic, which has at its lower end 32 structure including a slot 34 for attaching a fishing line (not shown) which may contain bait and and one or more fish hooks, (not shown)and a cap 36 to hold the line in place. Alternatively, the line can be connected to the shaft end 32 according to the the teachings of U.S. Pat. No. 5,329,722, hereby incorporated by this refernece as if fully set forth herein.

Opening 29 is of suffeciently greater cross section to define a gap G, preferably about $\frac{1}{32}$ to $\frac{1}{16}$ inches, while opening 24 is sealed to shaft 30 with commercially available adhesives or glue, and defines a fixed level for expansion of the bellows 16. For light hooks and bait the bellows are located in a crunched or squeezed position with the bellows convolutions contacting each other or close to contacting each other. For heavier the hooks and bait the bellows are extended and air enters through the gap G defined by shaft 30 and shaft guide portion 28 to provide the additional boyancy required for the added weight to keep the bobber afloat. The bellows remains at the desired extended position without additional means to maitain the bellows at the selected position.

When the float is in the water, water does not enter the chamber 12 because there is no other opening in the bellows for the air to exit if water were to enter. Shaft guide 20 is sealed to shaft 30 with a commercially adhesive such as glue so that air cannot exit chamber 12 to allow water to enter through gap G.

At its upper end the plastic shaft 30 includes indicating structure 40 which facilities viewing the float from a distance. The indicating structure includes indicators 42–45, which are connected to shaft 30 with a sleeve fitting 48, and fasteners 49.

In use, for light hooks and bait the bellows are located in a crunched or squeezed position with the bellows convolutions contacting each other, or close to contacting each other. For heavier the hooks and bait the bellows are extended so that air enters through the gap G defined by shaft 30 and shaft guide portion 28 to provide the additional boyancy required for the added weight to keep the bobber afloat. The bellows remains in the selected extended position without additonal fastening means to maintain it at the selected extended position.

Plastic shaft 30 has at its lower end 32 a slot 34 for attaching a fishing line (not shown) which may contain bait and and one or more fish hooks, (not shown). A cap 36 is used to hold the line in place.

Alternatively, the line can be connected to the shaft end 32 according to the the teachings of U.S. Pat. No. 5,329,722, hereby incorporated by this refernece as if fully set forth herein.

At its upper end the plastic shaft 30 includes indicating structure 40 which facilities viewing the float from a distance when a strike is made. The indicators 42–45, may be made in which enable the action of the float to be observed in timees of poor lighting and may include a battery powerered light to illuminate the indicators.

What is claimed is:

1. A boyancy adjustable float comprising:
    an air chamber formed from a plastic convoluted bellows tube having a top end and a bottom end and having convolutions which can be expanded or contracted to vary the size of the air chamber;
    shaft guide means at said top end of said bellows tube having an opening and
    shaft guide means at said bottom end of said bellows tube having an opening;
    a shaft extending out of said top end and bottom of said bellows through said openings in said shaft guide means;
    said shaft guide top opening being sealed to said shaft;
    said shaft guide bottom opening being of sufficiently greater cross section than said shaft to define a gap to allow air to enter said chamber air; and
    said shaft having at a lower end, means for attaching a fishing line.

2. A boyancy adjustable float according to claim 2 wherein said bellows tube is made of a plastic material selected from polyethylene and polypropylene.

3. A boyancy adjustable float according to claim 2 wherein said shaft is made of acrylic plastic material.

4. A boyancy adjustable float according to claim 2 wherein said shaft is made of acrylic plastic material.

5. A boyancy adjustable float according to claim 2 wherein said top shaft guide means and said bottom shaft guide means include respective flange portions, hollow shaft portions and center openings.

6. A boyancy adjustable float according to claim 4 wherein said top shaft guide means and said bottom shaft guide means include respective flange portions, hollow shaft portions and center openings.

7. A boyancy adjustable float according to claim 2 wherein said shaft has at an upper end means for faciliting viewing the float from a distance.

8. A boyancy adjustable float according to claim 6 wherein said shaft has at an upper end means for faciliting viewing the float from a distance.

9. A boyancy adjustable float according to claim 2 wherein said means for attaching a fishing line include a include a slot in said shaft.

10. A boyancy adjustable float according to claim 9 wherein said means for attaching a fishing line include a cap to hold the line within said slot.

11. A boyancy adjustable float according to claim 8 wherein said means for attaching a fishing line include a include a slot in said shaft.

12. A boyancy adjustable float according to claim 11 wherein said means for attaching a fishing line include a cap to hold the line within said slot.

13. A boyancy adjustable float according to claim 7 wherein said means for facilitating viewing includes indicators which are connected to said shaft.

14. A boyancy adjustable float according to claim 8 wherein said means for facilitating viewing includes indicators which are connected to said shaft.

15. A boyancy adjustable float according to claim 12 wherein said means for facilitating viewing includes indicators which are connected to said shaft.

16. A boyancy adjustable float according to claim 1 wherein said gap is from about $\frac{1}{32}$ to $\frac{1}{16}$ inches.

17. A boyancy adjustable float according to claim 2 wherein said gap is from about $\frac{1}{32}$ to $\frac{1}{16}$ inches.

18. A boyancy adjustable float according to claim 12 wherein said gap is from about $\frac{1}{32}$ to $\frac{1}{16}$ inches.

* * * * *